(12) United States Patent
Hoelzl et al.

(10) Patent No.: US 10,998,938 B2
(45) Date of Patent: May 4, 2021

(54) NEAR FIELD COMMUNICATION DEVICE, METHOD FOR OPERATING A NEAR FIELD COMMUNICATION DEVICE, CHIP CARD AND WEARABLE

(71) Applicant: Infineon Technologies AG, Neubiberg (DE)

(72) Inventors: Juergen Hoelzl, Graz (AT); Josef Gruber, St. Ruprecht an der Raab (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/003,513

(22) Filed: Aug. 26, 2020

(65) Prior Publication Data

US 2021/0067203 A1  Mar. 4, 2021

(30) Foreign Application Priority Data

Aug. 29, 2019  (DE) .......................... 102019123198.1

(51) Int. Cl.
| | | |
|---|---|---|
| *H01Q 7/00* | (2006.01) | |
| *H01Q 9/04* | (2006.01) | |
| *H01Q 1/22* | (2006.01) | |
| *H04B 5/00* | (2006.01) | |

(52) U.S. Cl.
CPC ......... *H04B 5/0062* (2013.01); *H01Q 1/2208* (2013.01); *H01Q 7/00* (2013.01); *H04B 5/0031* (2013.01); *H04B 5/0081* (2013.01)

(58) Field of Classification Search
None
See application file for complete search history.

(56) References Cited

U.S. PATENT DOCUMENTS

| | | | | |
|---|---|---|---|---|
| 7,548,164 | B2* | 6/2009 | Guez ................... | G06K 19/0707 340/539.3 |
| 9,292,782 | B2* | 3/2016 | Savoj ............... | G06K 19/07749 |
| 9,450,646 | B2* | 9/2016 | Wong .................... | H04B 5/0031 |
| 9,553,747 | B2* | 1/2017 | Ramakrishnan ........ | H04L 27/04 |
| 9,960,819 | B2* | 5/2018 | Butler ....................... | H03F 3/19 |
| 10,122,557 | B1* | 11/2018 | Stiglic ................ | G06K 19/0723 |
| 10,135,650 | B2* | 11/2018 | Manteghi ............. | H01Q 9/0421 |
| 10,802,172 | B2* | 10/2020 | Thomas ............... | H04B 5/0062 |
| 2016/0112028 | A1* | 4/2016 | Baier .................... | H01L 23/495 343/861 |
| 2019/0067818 | A1* | 2/2019 | Cordier ................ | H01Q 1/2225 |

* cited by examiner

Primary Examiner — Tuan A Tran
(74) *Attorney, Agent, or Firm* — Schiff Hardin LLP

(57) ABSTRACT

A Near Field Communication (NFC) device for transmitting a signal, including an NFC transceiver circuit having a transmission terminal and a reception terminal connected to an antenna; an electronic signal damping circuit; and a controller configured to control the electronic signal damping circuit to dampen a signal at the reception terminal to have a lower impedance during a transmission mode of the NFC device, during which the NFC device transmits the signal by means of the antenna, as compared with during a reception mode of the NFC device.

15 Claims, 7 Drawing Sheets

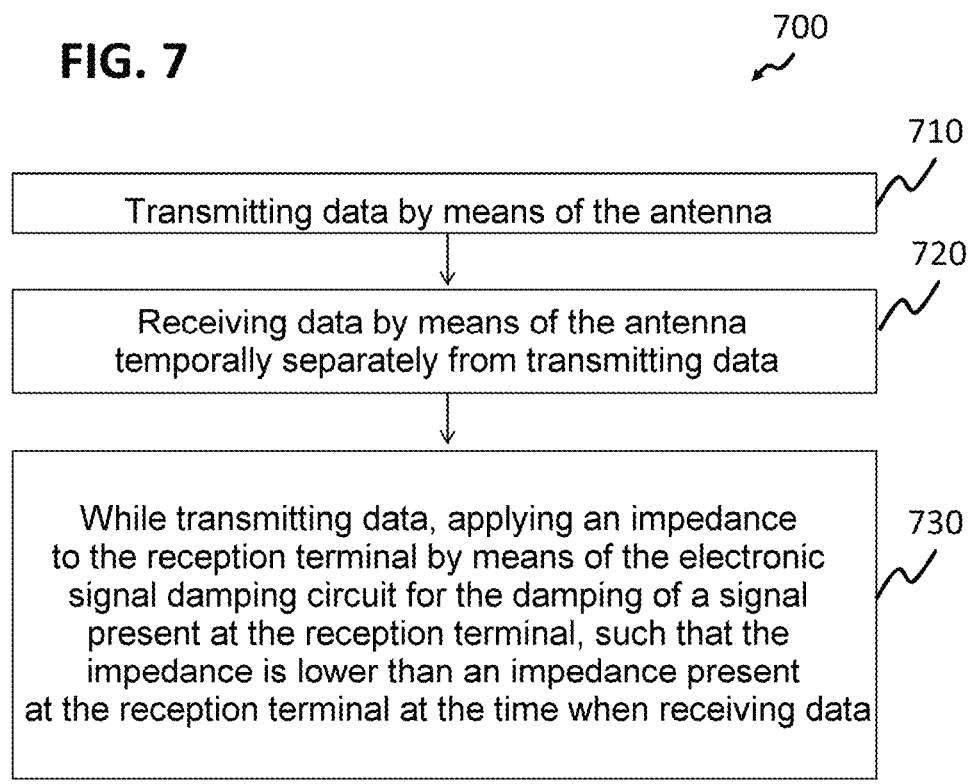

NEAR FIELD COMMUNICATION DEVICE, METHOD FOR OPERATING A NEAR FIELD COMMUNICATION DEVICE, CHIP CARD AND WEARABLE

FIELD OF THE INVENTION

The disclosure relates to a near field communication device, and a method for operating a near field communication device.

BACKGROUND

Modern electronic devices such as cellular phones and chip cards are often equipped with support for near field communication (NFC), for example in order to enable cashless payment. Particularly in connection with devices worn on the body or integrated in clothing (so-called "wearable devices", for short "wearables"), such as, for example, smart watches, a typical requirement here involves being able to manage with an antenna which is as small as possible, while the data communication is intended nevertheless to be effected efficiently and robustly.

At the present time it is necessary to make a compromise with regard to the best possible reception, on the one hand, and the highest possible transmission power, on the other hand. This is because the same antenna is used for transmission and reception, and at reception terminals used for reception, a maximum input voltage is also not permitted to be exceeded by signals fed into the antenna by transmission terminals.

In the case of very small antennas, this results in limitations, for example with regard to a transmission power and thus a range of the near field communication device, that is, a maximum distance between reader and near field communication device.

SUMMARY

In accordance with various exemplary embodiments, a near field communication device is provided which, "only" during transmission, damps a transmission signal present at a reception terminal. Accordingly, a high transmission power can be provided despite a sensitive reception terminal.

In various exemplary embodiments, a near field communication device is provided which provides both a high transmission power and good reception properties despite a small antenna.

BRIEF DESCRIPTION OF THE DRAWINGS

Exemplary embodiments of the disclosure are illustrated in the figures and are explained in greater detail below.

In the figures:

FIG. 7 shows a flow diagram of a method for operating a communication device in accordance with various exemplary embodiments.

DETAILED DESCRIPTION

In the following detailed description, reference is made to the accompanying drawings, which form part of this description and show for illustration purposes specific embodiments in which the disclosure can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present disclosure. It goes without saying that the features of the various exemplary embodiments described herein can be combined with one another, unless specifically indicated otherwise. Therefore, the following detailed description should not be interpreted in a restrictive sense, and the scope of protection of the present disclosure is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

Figure 1:
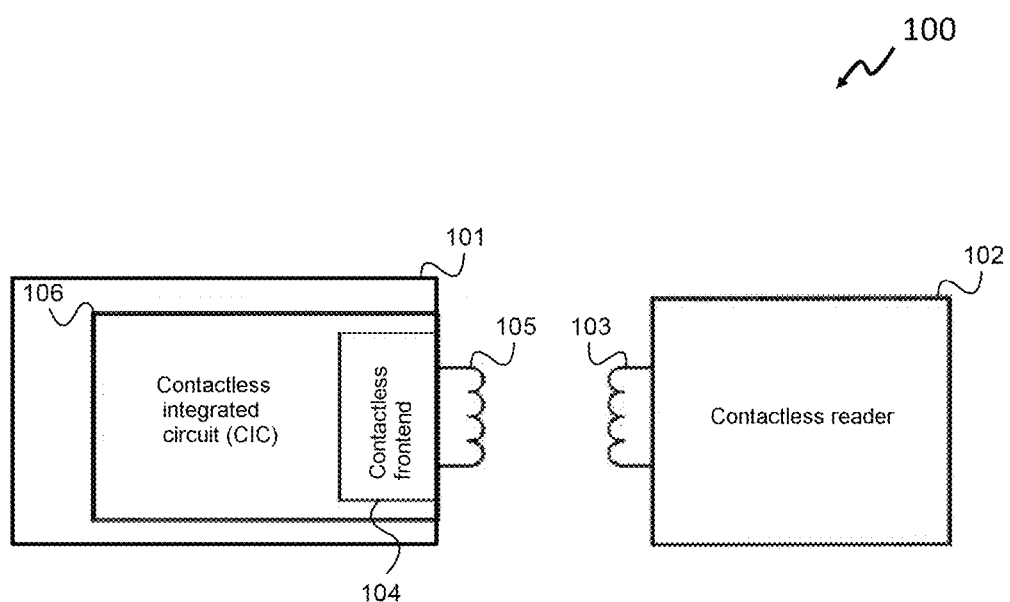
FIG. 1 shows a schematic illustration of a communication arrangement comprising a passive near field communication device.

FIG. 1 shows a communication arrangement 100 comprising a passive NFC communication device 101.

The NFC communication device 101 can communicate with an NFC reader device 102, also referred to as a contactless reader 102 or as a PCD (proximity coupling device).

The NFC reader device 102 can emit a reader field via a reader antenna 103, which field can modulate a frontend for contactless communication 104 of the NFC communication device 101 using an NFC antenna 105. The modulation can in turn be detected by the NFC reader device 102. An integrated circuit 106 of the NFC communication device 101 can control the modulation in such a way that in this way data can be transferred from the NFC communication device 101 to the NFC reader device 102. The frontend 104 can be part of the integrated circuit 106, for example.

The passive communication device 101 typically does not have a dedicated energy supply, such as a battery. In other words, the passive communication device 101 is free of a dedicated energy supply. The passive communication device 101 is often used in chip cards (e.g., a smart card) in the typical card form (e.g., canteen cards, identity cards, or cards for payment in local public transport).

Figure 2:
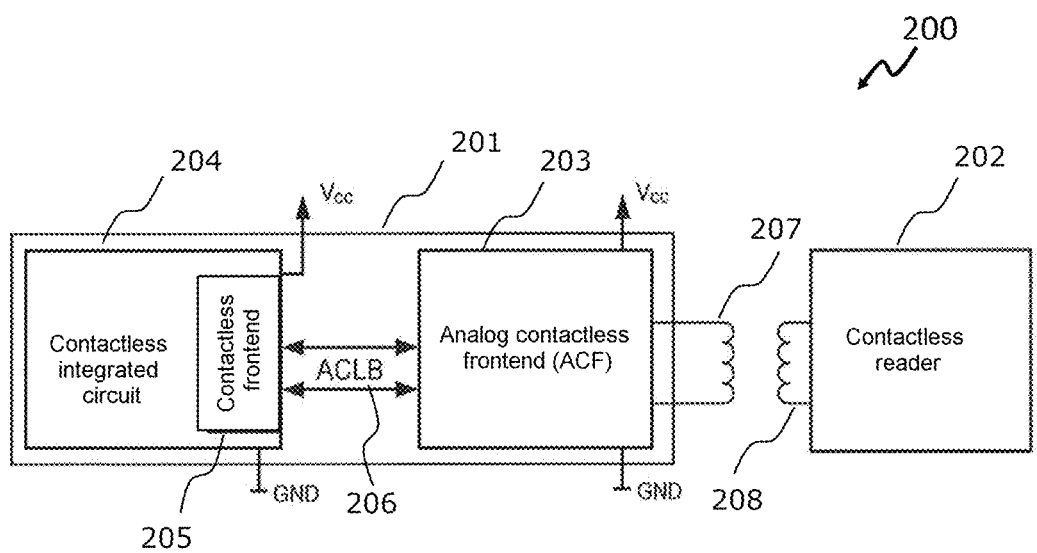
FIG. 2 shows a schematic illustration of a communication arrangement comprising an active near field communication device.

FIG. 2 shows a communication arrangement 200 comprising an active NFC communication device 201.

In a manner similar to that in FIG. 1, the NFC communication device 201 can communicate with an NFC reader device 202.

In this example, however, the NFC communication device 201 is an active communication device, meaning it has an active analog booster frontend 203 for contactless communication with the NFC reader device 202. The booster frontend 203 can be connected via an interface 206, for example, via an ACLB (Active Contactless Bridge) or via a SWP Interface (Single Wire Protocol Interface), to an integrated circuit 204, which can comprise a contactless frontend 205.

The integrated circuit 204 can exchange data with the booster frontend 203 via the interface 206. The booster frontend 203 can be coupled to an NFC antenna 207 of the NFC communication device 201 and, via the NFC antenna 207, transmit radio signals to the reader device 202, which radio signals can be received by the reader device 202 by means of a reader antenna 208. Moreover, by means of the NFC antenna 207, the booster frontend 203 can receive radio signals emitted by the reader device 202 by means of the reader antenna 208.

In order to transfer data to the reader device 202, the NFC communication device 201 (e.g., the booster frontend 203) can modulate a carrier signal. A corresponding carrier oscillation having a certain carrier frequency can be provided by a frequency generator, which can be part of the NFC communication device 201, typically an oscillator.

Both the integrated circuit and the booster frontend are active components and have a voltage supply, which is typically provided by a rechargeable battery, as is indicated by the terminals Vcc (for the supply voltage) and GND (for the ground potential).

"Boosted" NFC communication devices 201 enable contactless data exchange even in a case where less space is available for the antenna 207 compared with e.g. in typical applications of passive NFC communication devices 101 (e.g. smart cards). That may be the case for example for smart watches, smart rings or the like, e.g. other wearables, in which the antennas 207 have to be significantly smaller than in smart cards.

In such applications, antenna areas may be less than 100 mm$^2$, for example. That means that a coupling factor between the NFC communication device 201 and the reader device 202 is very weak. That has the effect, firstly, that it may be necessary for the NFC communication device 201 to transmit with a high transmission power and, secondly, that the received signal is very weak.

Figure 3:
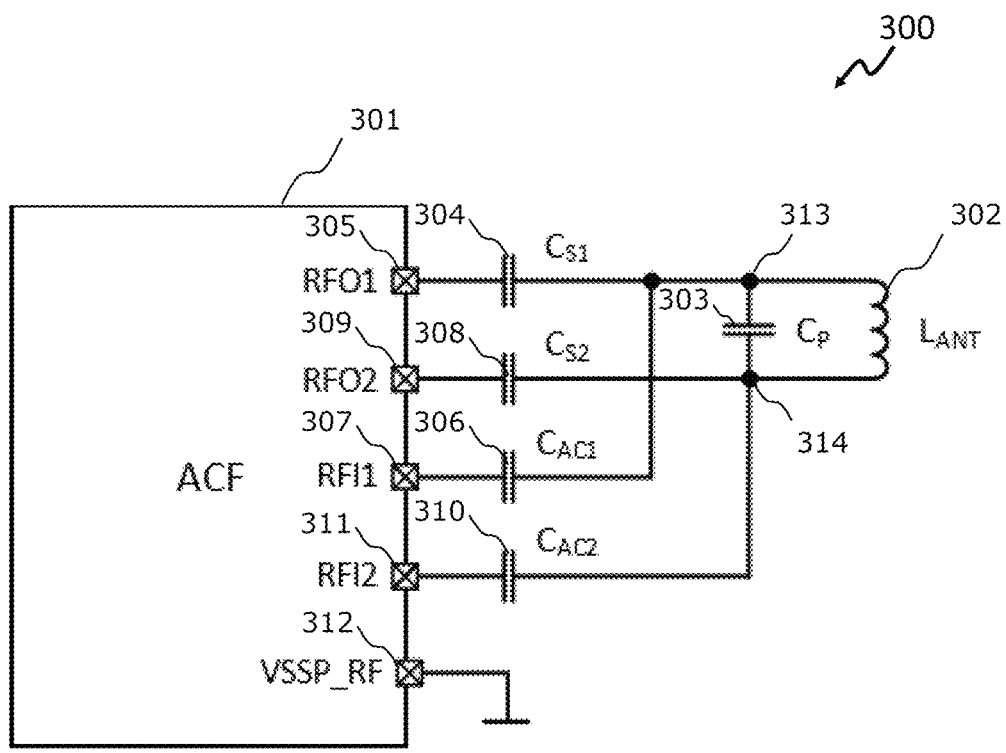
FIG. 3 shows a schematic illustration of a near field communication device.

FIG. 3 shows a schematic illustration of a near field communication device 300 which illustrates the problem area.

The frontend 301 can correspond to the booster frontend 203 from FIG. 2, for example, and the antenna 302 to the NFC antenna 207.

The antenna 302 together with capacitances 303, 304, 308, a first transmission terminal 305 and a second transmission terminal 309 of the frontend 301 can form an antenna resonant circuit.

A first terminal 313 of the antenna 302 can be coupled to the first transmission terminal 305 of the frontend 301 via the capacitance 304 and to a first reception terminal 307 of the frontend 301 via a capacitance 306.

A second terminal 314 of the antenna 302 can be coupled to the second transmission terminal 309 of the frontend 301 via the capacitance 308 and to a second reception terminal 311 of the frontend 301 via a capacitance 310.

The frontend 301 can additionally comprise a grounding terminal 312.

FIG. 3 shows that a voltage applied to the antenna resonant circuit by means of the transmission terminals 305, 309, despite the capacitances 306, 310, can be present at least substantially at the reception terminals 307, 311.

Figure 5:
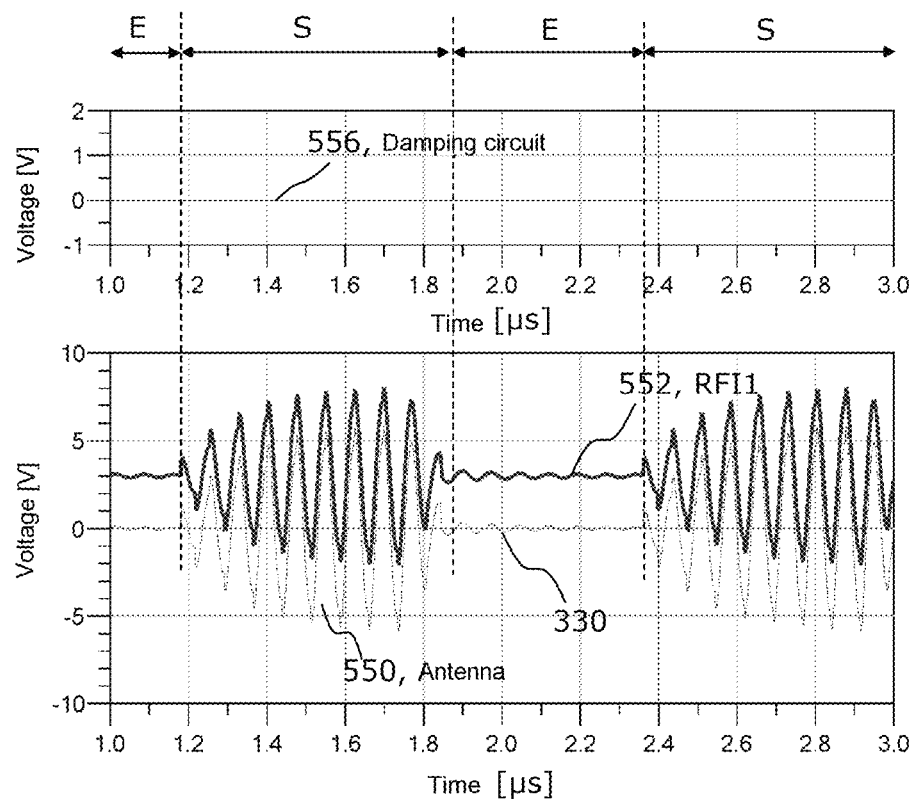
FIG. 5 shows an illustration of exemplary voltage profiles that can occur in a near field communication device.

That is shown in FIG. 5, which illustrates exemplary voltage profiles that can occur in an NFC communication device such as, for example, the NFC communication device 300 from FIG. 3. The NFC communication device 300 from FIG. 3 does not have a damping circuit. The voltage profile 556 of a damping circuit with a constant value of 0 V is merely indicated in order to illustrate that precisely no damping circuit is used.

The voltage 550 illustrated in terms of its temporal profile is that voltage which is applied by means of the transmission terminals 305, 309 during the transmission of a signal (in a transmission mode; a corresponding transmission period is identified by S) at the antenna 302 or is present from the antenna 302 during reception of a signal (in a reception mode; a corresponding reception period is identified by E) at the antenna 302.

The voltage 552 present at the first reception terminal 307 is illustrated as voltage 552 in the temporal profile.

In the example from FIG. 5, the voltage 550 attains peak-to-peak voltage values of approximately 12 V during transmission. The voltage 552 present at the reception terminals 307, 311 is approximately of the same order of magnitude. In the present example, the reception terminals 307, 311 can be configured such that they can tolerate this voltage 552.

For a higher range, however, a higher voltage 550 for the transmitted signal would be desirable, for example in a range of approximately 20 V to approximately 30 V.

However, this would possibly result in a maximum permissible operating voltage being exceeded at the reception terminals 307, 311 of the frontend 301. In some cases, the maximum permissible operating voltage can be limited by transistors, protective diodes and similar components, for example to approximately 8 V, possibly better to not more than 5-6 V. Accordingly, it may be necessary to choose a capacitance of the capacitors 306, 310, which together with input capacitances of the reception terminals 307 and 311, respectively, form capacitive voltage dividers, such that the signal 552 received at the reception terminals 307, 311 remains below the maximum permissible operating voltage during transmission. However, this means that the signal is also reduced in the same ratio during reception, which signal should preferably be as large as possible.

This problem has not been solved at the present time. The typical procedure of striving for a compromise between best reception and best transmission results in limitations in range.

In various exemplary embodiments, as illustrated on the basis of one exemplary embodiment in FIG. 4, an NFC communication device 400 is provided, comprising an electronic signal damping circuit 440, which, by means of a controller 444, can be used, during a transmission process, to damp a voltage 552 present at reception terminals 307, 311 of a frontend 301 (in this respect, see FIG. 6) and thus to keep said voltage below the maximum permissible operating voltage at the reception terminals 307, 311 of the frontend 301. The electronic signal damping circuit 440 can comprise for example an impedance component (e.g., a resistor).

Figure 4:
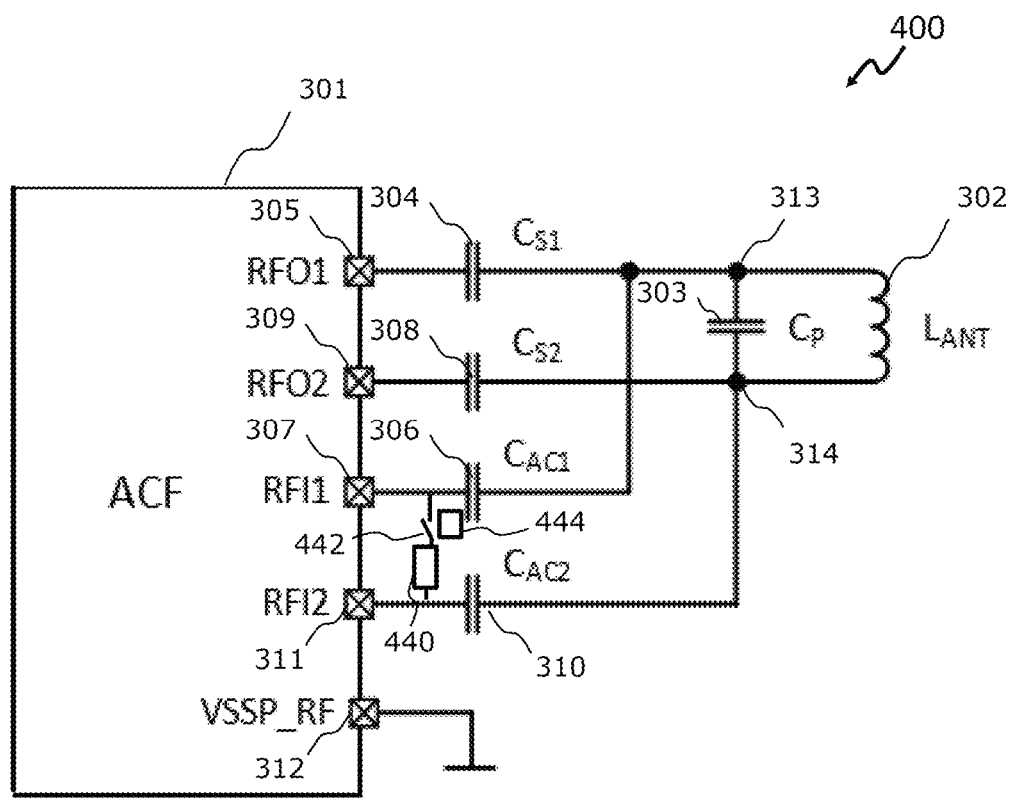
FIG. 4 shows a schematic illustration of a near field communication device in accordance with various exemplary embodiments.

Apart from the electronic signal damping circuit 440, which in the present example is arranged such that it is able to be coupled (e.g., is electrically conductively connectable) between the first reception terminal 307 and the second reception terminal 311, and the controller 444, components and functions of the exemplary embodiment illustrated in FIG. 4 for an NFC communication device 400 at least substantially correspond to those illustrated in FIG. 3.

In various exemplary embodiments (not illustrated), the NFC communication device 400 can comprise a monopole antenna as the antenna 302, and can accordingly comprise just one transmission terminal and one reception terminal. In such a case, and/or in other exemplary embodiments, the electronic signal damping circuit 440 can be able to be coupled (e.g. electrically conductively connectable) between the reception terminal and a grounding terminal.

In various exemplary embodiments, the couplable (e.g., electrically conductively connectable) electronic signal damping circuit 440 can be used in such a way that (e.g., by means of the controller 444 in conjunction with a switch 442) the signal damping circuit 440 is coupled only during the transmission of the signal; this brings about a damping of the signal present at the antenna 302 at the reception terminals 307, 311. The signal damping circuit 440 is disconnected or remains disconnected from the reception terminal or the reception terminals 307, 311 during the reception of a signal; this has the effect that the undamped signal is provided at the reception terminal or reception terminals 307, 311.

To put it another way, the controller 444 can be configured in such a way that by means of the electronic signal damping circuit 440 in a transmission mode of the near field communication device 400 for transmitting a signal by means of the antenna 302 a lower impedance is present at the reception terminal (here: for example the two reception terminals 307, 311) for the damping of a signal present at the reception terminal 307, 311 compared with in a reception mode of the near field communication device 400. This procedure can also be referred to as echo damping.

Figure 6:
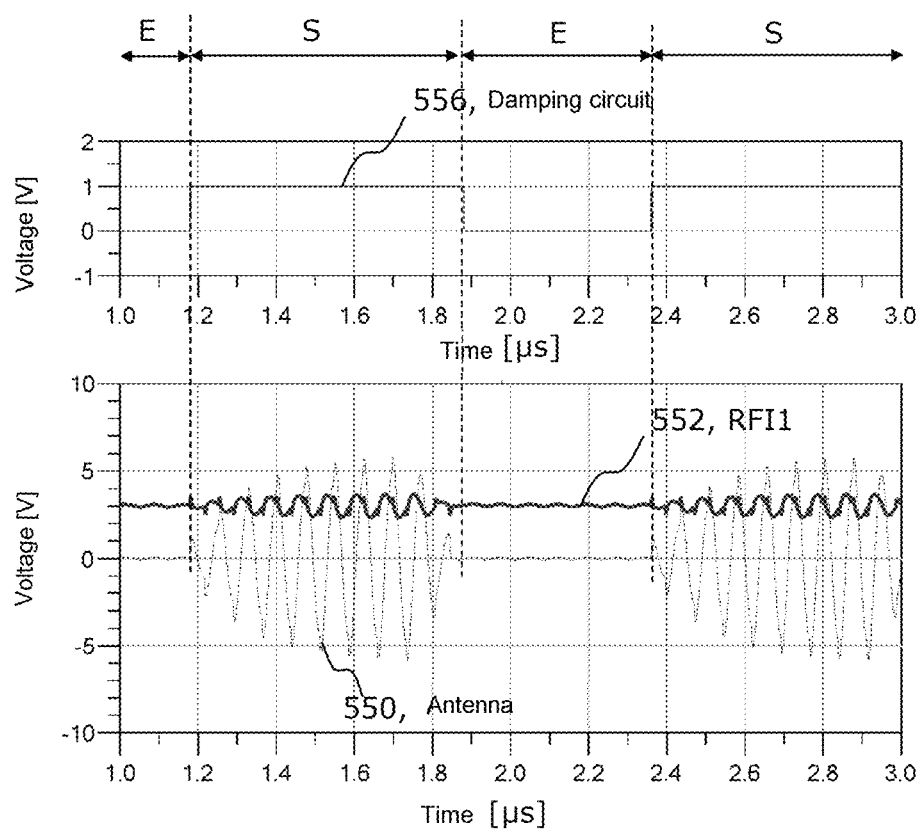
FIG. 6 shows an illustration of exemplary voltage profiles that can occur in a near field communication device in accordance with various exemplary embodiments.

FIG. 6 illustrates an effect of the electronic signal damping circuit 440 in an NFC communication device 400, for example the one from FIG. 4. Designations in FIG. 6 correspond to those from FIG. 5. In contrast to FIG. 5, the near field communication device 400, the voltage profiles of which are illustrated in FIG. 6, comprises the electronic signal damping circuit 440. By means of a switching voltage 556, e.g. 1 V, applied to the switch 442 by the controller 444, the electronic signal damping circuit 440 can be coupled to the reception terminal (here: for example between the two reception terminals 307, 311).

As is evident in FIG. 6, the controller 444 can be configured to provide the switching voltage 556 during the transmission periods S.

Although a voltage 550 provided at the antenna 302 by means of the transmission terminals 305, 309 is once again of the same order of magnitude as in FIG. 5, that is to say is an approximately 12 V peak-to-peak voltage, a peak-to-peak value for a voltage 552 measured at the first reception terminal 307 is approximately 1 V, that is to say approximately one tenth of the transmission voltage.

That means that during the use of the electronic signal damping circuit 440 as described (applying the lower impedance only during transmission), the voltage 552 that reaches the reception terminal is so low in comparison with the transmission voltage 550 that the transmission voltage 550 can be increased (for example to a range of approximately 20 V to approximately 30 V peak-to-peak), without the reception terminal incurring damage.

In various exemplary embodiments, the signal at the reception terminal 307 (e.g., 307, 311) can comprise at most half of the signal available at the antenna 302, for example at most half of the peak-to-peak voltage, which would correspond to a damping by 50%. In various exemplary embodiments, the damping can comprise more than 50%, for example more than 60%, more than 70%, more than 80% or more than 90%.

The fact that the damping of the signal 552 received at the reception terminals 307, 311 during transmission is brought about by means of the electronic signal damping circuit 440 can make it possible to dispense with or substantially dispense with a reduction of the signal by means of the capacitive voltage divider formed by the first reception terminal 307 and the capacitor 306 or respectively the second reception terminal 311 and the capacitor 310. Accordingly, a respective capacitance of the capacitor 306 and of the capacitor 310 (in the case of a monopole antenna accordingly only one of the capacitors) can be chosen to be large vis á vis an input capacitance of the reception terminal 307 or respectively 311. By way of example, the capacitance of the capacitor 306 can be a multiple of the capacitance of the reception terminal 307, e.g. double, triple, quadruple, . . . , ten-fold or the like. Accordingly, substantially the full reception signal received at the antenna 302 can be provided at the reception terminals 307, 311.

As illustrated above, the near field communication device 400 in accordance with various exemplary embodiments makes it possible that increasing a signal strength of a transmitted signal is made possible in the transmission mode, and at the same time a signal strength of the signal provided at the reception terminal is increased in the reception mode.

In various exemplary embodiments, the NFC communication device 400, for transferring data to a reader device 202, can generate the signal by means of an oscillator. For the transfer, the NFC communication device 400 can synchronize its oscillator 209 with a frequency of a radio signal (also referred to as the reader field) which is emitted by the reader device 202 and which can be regarded as a reference signal for the NFC communication device 400.

The oscillator can be part of a PLL (phase locked loop) system, a DLL (delay locked loop) system or a mixed system, and the booster frontend 203 can synchronize the oscillator and thus its transmission frequency, such as the carrier signal that it uses for transmission, with the frequency and the phase of the radio signal emitted by the reader device 202. For this purpose, it may be necessary for the NFC communication device 400 to receive the radio signal emitted by the reader device 202.

The increased signal strength for the received signal 552 in various exemplary embodiments can make it possible to provide a good signal quality for the PLL/DLL synchronization.

In various exemplary embodiments, the NFC communication device 400 can provide an increased reception strength for antennas with a high quality factor and/or a high inductance, particularly if said antennas have small antenna areas of, for example, less than 100 mm².

In various exemplary embodiments, the NFC communication device 400 can provide an increased load modulation amplitude for antennas 302 with a high quality factor and/or a high inductance, particularly if said antennas have small antenna areas of, for example, less than 100 mm².

In various exemplary embodiments, it is possible to provide the NFC communication device 400 with an increased signal-to-noise ratio for operating the DLL/PLL.

A maximum possible communication distance between the NFC communication device 400 and the reader device 202 can thus be achieved. Furthermore, the quality of the communication can be increased.

Various exemplary embodiments are specified below.

Exemplary embodiment 1 is a near field communication device. The near field communication device can comprise an NFC transceiver circuit having a transmission terminal and a reception terminal for connecting an antenna, an electronic signal damping circuit, and a controller, which is configured in such a way that by means of the electronic signal damping circuit in a transmission mode of the near field communication device for transmitting a signal by means of the antenna a lower impedance is present at the reception terminal for the damping of a signal present at the reception terminal compared with in a reception mode of the near field communication device.

Exemplary embodiment 2 is a near field communication device in accordance with exemplary embodiment 1, wherein the controller comprises a switch.

Exemplary embodiment 3 is a near field communication device in accordance with exemplary embodiment 2, wherein the controller is configured to control the switch in such a way that in the transmission mode the reception terminal is electrically conductively connected to the electronic signal damping circuit, and in the reception mode the reception terminal is disconnected from the electronic signal damping circuit.

Exemplary embodiment 4 is a near field communication device in accordance with any of exemplary embodiments 1 to 3, wherein the transmission mode comprises transmitting a signal by means of the antenna, wherein a transmitted signal damped by means of the electronic signal damping circuit is present at the reception terminal during the transmission.

Exemplary embodiment 5 is a near field communication device in accordance with exemplary embodiment 4, wherein a maximum signal strength of the damped transmitted signal at the reception terminal comprises less than half of the maximum signal strength of the transmitted signal.

Exemplary embodiment 6 is a near field communication device in accordance with any of exemplary embodiments 1 to 5, wherein the reception mode comprises receiving a signal by means of the antenna, wherein the undamped or substantially undamped signal is present at the reception terminal during the receiving.

Exemplary embodiment 7 is a near field communication device in accordance with any of exemplary embodiments 1 to 6, wherein the near field communication device furthermore comprises a further reception terminal and a further transmission terminal for connecting the antenna.

Exemplary embodiment 8 is a near field communication device in accordance with exemplary embodiment 7, wherein the controller is configured to control the switch in such a way that in the transmission mode the reception terminal and the further reception terminal are electrically conductively connected to the electronic signal damping circuit, and in the reception mode the reception terminal and the further reception terminal are disconnected from the electronic signal damping circuit.

Exemplary embodiment 9 is a near field communication device in accordance with any of exemplary embodiments 1 to 8, wherein the electronic signal damping circuit comprises an impedance component.

Exemplary embodiment 10 is a near field communication device in accordance with any of exemplary embodiments 1 to 9, wherein the near field communication device furthermore comprises a first capacitor having a first and a second terminal, wherein the first terminal is connected to the antenna and the second terminal is connected to the reception terminal and is connectable to the electronic signal damping circuit in the transmission mode.

Exemplary embodiment 11 is a near field communication device in accordance with exemplary embodiment 10, wherein a capacitance of the first capacitor is higher than a capacitance of the reception terminal.

Exemplary embodiment 12 is a near field communication device in accordance with exemplary embodiment 10 or 11, wherein the near field communication device furthermore comprises a second capacitor having a first and a second terminal, wherein the first terminal is connected to the antenna and the second terminal is connected to the transmission terminal.

Exemplary embodiment 13 is a near field communication device in accordance with exemplary embodiment 12, wherein a capacitance of the first capacitor is higher than a capacitance of the second capacitor.

Exemplary embodiment 14 is a near field communication device in accordance with any of exemplary embodiments 1 to 13, furthermore comprising: an active booster frontend connected to the NFC transceiver circuit.

Exemplary embodiment 15 is a near field communication device in accordance with any of exemplary embodiments 1 to 14, wherein the transmission mode and the reception mode are separated in time.

Exemplary embodiment 16 is a chip card comprising a near field communication device in accordance with any of exemplary embodiments 1 to 15.

Exemplary embodiment 17 is a wearable comprising a near field communication device in accordance with any of exemplary embodiments 1 to 15.

Exemplary embodiment 18 is a method for operating a near field communication device, wherein the near field communication device comprises an NFC transceiver circuit having a transmission terminal and a reception terminal for connecting an antenna, and an electronic signal damping circuit. The method can comprise transmitting data by means of the antenna, receiving data by means of the antenna temporally separately from transmitting data and, while transmitting data, applying an impedance to the reception terminal by means of the electronic signal damping circuit for the damping of a signal present at the reception terminal, such that the impedance is lower than an impedance present at the reception terminal at the time when receiving data.

Exemplary embodiment 19 is a method in accordance with exemplary embodiment 18, wherein applying an impedance comprises controlling a switch in such a way that in the transmission mode the reception terminal is electrically conductively connected to the electronic signal damping circuit, and in the reception mode the reception terminal is disconnected from the electronic signal damping circuit.

Exemplary embodiment 20 is a method in accordance with exemplary embodiment 18 or 19, wherein a transmitted signal damped by means of the electronic signal damping circuit is present at the reception terminal during the transmission.

Exemplary embodiment 21 is a method in accordance with exemplary embodiment 20, wherein a maximum signal strength of the damped transmitted signal at the reception terminal comprises less than half of the maximum signal strength of the transmitted signal.

Exemplary embodiment 22 is a method in accordance with any of exemplary embodiments 18 to 21, wherein the undamped or substantially undamped signal is present at the reception terminal during the receiving.

Exemplary embodiment 23 is a method in accordance with any of exemplary embodiments 18 to 22, wherein the near field communication device furthermore comprises a further reception terminal and a further transmission terminal for connecting the antenna, wherein applying an impedance comprises controlling a switch in such a way that during the transmitting the reception terminal and the further reception terminal are electrically conductively connected to the electronic signal damping circuit, and during the receiving the reception terminal and the further reception terminal are disconnected from the electronic signal damping circuit.

Exemplary embodiment 24 is a method in accordance with any of exemplary embodiments 18 to 23, wherein the electronic signal damping circuit comprises an impedance component, for example a resistor.

Exemplary embodiment 25 is a method in accordance with any of exemplary embodiments 18 to 24, wherein the near field communication device furthermore comprises a first capacitor having a first and a second terminal, wherein the first terminal is connected to the antenna and the second terminal is connected to the reception terminal, wherein the method furthermore comprises during the transmitting, connecting the electronic signal damping circuit to the second terminal of the first capacitor.

Exemplary embodiment 26 is a method in accordance with exemplary embodiment 25, wherein a capacitance of the first capacitor is higher than a capacitance of the reception terminal.

Exemplary embodiment 27 is a method in accordance with exemplary embodiment 26, wherein the near field communication device furthermore comprises a second capacitor having a first and a second terminal, wherein the first terminal is connected to the antenna and the second terminal is connected to the transmission terminal.

Exemplary embodiment 28 is a method in accordance with exemplary embodiment 27, wherein a capacitance of the first capacitor is higher than a capacitance of the second capacitor.

Exemplary embodiment 29 is a method in accordance with any of exemplary embodiments 18 to 28, wherein the near field communication device furthermore comprises an active booster frontend connected to the NFC transceiver circuit.

Exemplary embodiment 30 is a method in accordance with any of exemplary embodiments 18 to 29, wherein the transmitting and the receiving are carried out temporally separately.

Further configurations of the method are evident from the description of the device, and vice versa.

The invention claimed is:

1. A Near Field Communication (NFC) device for transmitting a signal, comprising:
   an NFC transceiver circuit having a transmission terminal and a reception terminal connected to an antenna;
   an electronic signal damping circuit; and
   a controller configured to control the electronic signal damping circuit to dampen a signal at the reception terminal to have a lower impedance during a transmission mode, during which the NFC device transmits the signal by means of the antenna, as compared with during a reception mode.

2. The NFC device as claimed in claim 1, wherein the controller comprises a switch.

3. The NFC device as claimed in claim 2, wherein the controller is configured to control the switch such that during the transmission mode the reception terminal is electrically conductively connected to the electronic signal damping circuit, and during the reception mode the reception terminal is disconnected from the electronic signal damping circuit.

4. The NFC device as claimed in claim 1, further comprising:
   a further reception terminal and a further transmission terminal connected to the antenna.

5. The NFC device as claimed in claim 4,
   wherein the controller is configured to control the switch such that during the transmission mode the reception terminal and the further reception terminal are electrically conductively connected to the electronic signal damping circuit, and during the reception mode the reception terminal and the further reception terminal are disconnected from the electronic signal damping circuit.

6. The NFC device as claimed in claim 1,
   wherein the electronic signal damping circuit comprises an impedance component.

7. The NFC device as claimed in claim 1, further comprising:
   a first capacitor having a first terminal connected to the antenna, and a second terminal connected to the reception terminal and connectable to the electronic signal damping circuit in the transmission mode.

8. The NFC device as claimed in claim 7, further comprising:
   a second capacitor having a first terminal connected to the antenna and a second terminal connected to the transmission terminal.

9. The NFC device as claimed in claim 7,
   wherein a capacitance of the first capacitor is higher than a capacitance of the reception terminal.

10. A chip card comprising the NFC device as claimed in claim 1.

11. A wearable comprising an NFC device as claimed in claim 1.

12. A method for operating a Near Field Communication (NFC) device, wherein the NFC device has an NFC transceiver circuit with a transmission terminal and a reception terminal for connecting an antenna, and an electronic signal damping circuit, the method comprising:
   transmitting data by means of the antenna;
   receiving data by means of the antenna temporally separately from transmitting data;
   while transmitting data during a transmission mode, applying an impedance to the reception terminal by means of the electronic signal damping circuit configured to dampen a signal present at the reception terminal, such that the impedance is lower than an impedance present at the reception terminal when receiving data during a reception mode.

13. The method as claimed in claim 12,
   wherein the applying an impedance comprises controlling a switch such that during the transmission mode the reception terminal is electrically conductively connected to the electronic signal damping circuit, and during the reception mode the reception terminal is disconnected from the electronic signal damping circuit.

14. The method as claimed in claim 12,
   wherein the NFC device further comprises a further reception terminal and a further transmission terminal connected to the antenna, and
   wherein the applying the impedance comprises controlling a switch such that during the transmitting the reception terminal and the further reception terminal are electrically conductively connected to the electronic signal damping circuit, and during the receiving the reception terminal and the further reception terminal are disconnected from the electronic signal damping circuit.

15. The method as claimed in claim 12, wherein the NFC device further comprises a first capacitor having a first terminal connected to the antenna and a second terminal connected to the reception terminal, the method further comprising:

during the transmitting, connecting the electronic signal damping circuit to the second terminal of the first capacitor.

* * * * *